Patented Dec. 23, 1941

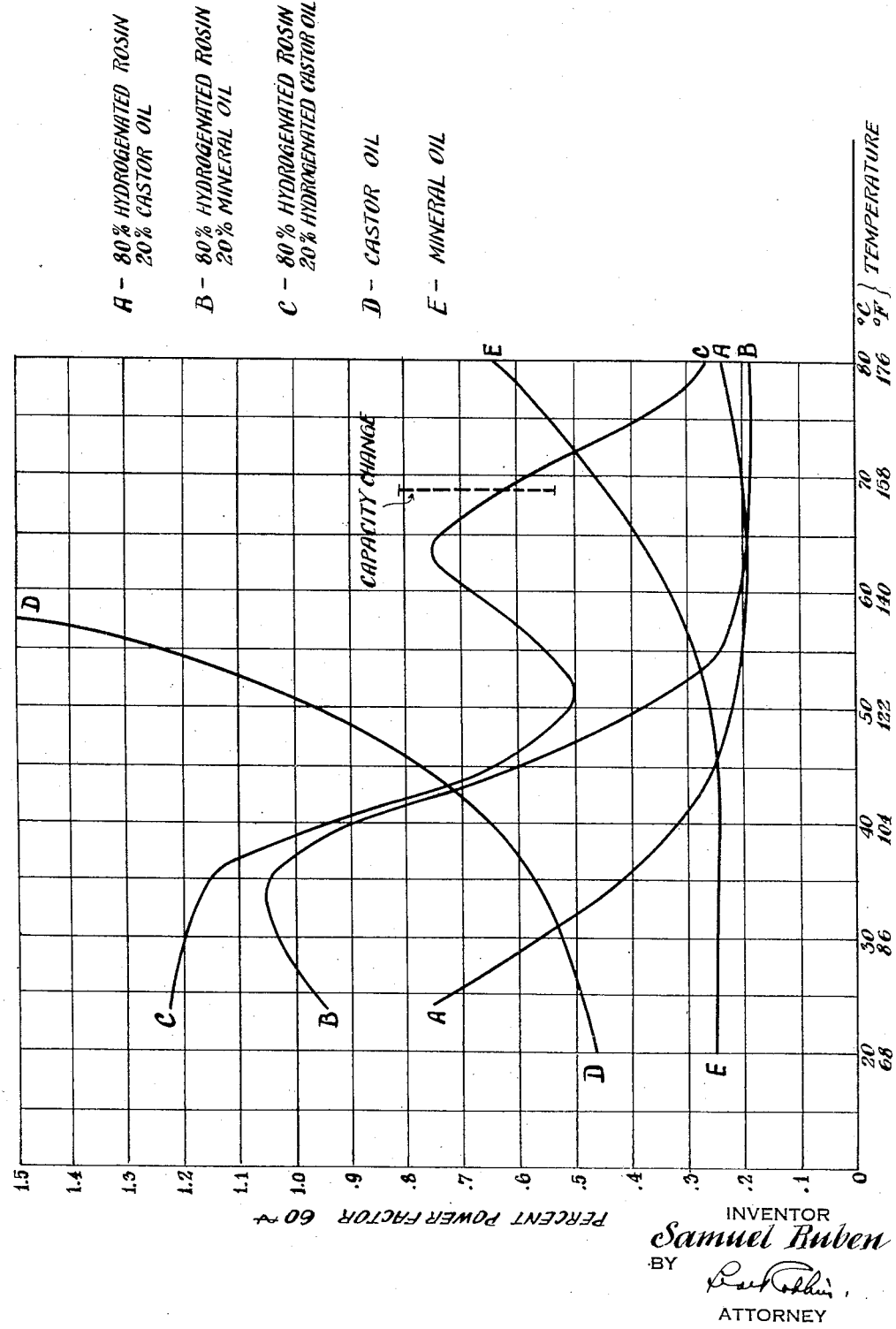

2,266,810

UNITED STATES PATENT OFFICE 2,266,810

DIELECTRIC FOR ELECTROSTATIC CONDENSERS

Samuel Ruben, New Rochelle, N. Y.

Application March 13, 1939, Serial No. 261,501

13 Claims. (Cl. 175—41)

This invention relates to a dielectric material for electrostatic condensers and the like.

The general object of the invention is the provision of a new and improved dielectric in solid thermoplastic form capable of continuous operation in capacitors for alternating and direct current operation.

The improved dielectric material comprises a hydrogenated wood resin combined with a dielectric plasticizer to produce a stable thermoplastic thermoadhesive composition.

The figure of the drawing contains graphs showing the power-factor vs. temperature characteristics of the dielectric material of the present invention and of certain other materials.

Rosin has been heretofore used in electrostatic condensers as an anti-oxidant for mineral oil. As a dielectric rosin is undesirable because of its many inherent limitations such as brittleness, low voltage breakdown, increase of power factor with temperature and because of the presence of unsaturated rosin acids. Also it is chemically unstable under electrical field conditions. It is subject to oxidation and due to its viscous gummy character even when heated does not satisfactorily impregnate wound foil type condensers. Its low voltage breakdown especially under continuous alternating current operation is a major disadvantage.

I have found that rosin, stabilized by hydrogenation to saturate the unsaturated acid bonds possesses characteristics which permit its use when combined with another dielectric having the property of plasticizing the brittle hydrogenated rosin. Further, that in combining with such other dielectrics for instance, mineral oil or castor oil, the electrical characteristics of these added materials are changed. This can be noted in the accompanying graphs. Other hydrogenated wood resins such as hydrogenated turpentine can also be used.

Turpentine, an oleo-resin, in some instances derived from the same source as rosin, is entirely unsuited as a dielectric because of its chemical and physical character. When polymerized, then hydrogenated to a clear white resin, however, it possesses properties similar to hydrogenated rosin though of a somewhat lower power factor.

In both cases the hydrogenation may be accomplished by a process in which the resins are heated to a temperature in the order of 200° C. under a pressure of 1000 pounds of hydrogen in the presence of a catalyzer for several hours, the time and pressure being dependent upon the degree of polymerization of the resin and the desired extent of hydrogenation.

In preparing the dielectric compositions of this invention, the hydrogenated wood resin is combined with another dielectric such as mineral oil or castor oil, which has the property of plasticizing the resin. The hydrogenated wood resins may also be combined with hydrogenated castor oil which, although a brittle, crystalline material, has the property of plasticizing the resin and increases the capacitance about 50% over that obtained by combining the hydrogenated wood resin with mineral oil.

The percentage of plasticizing dielectric used will depend upon the operating temperature expected to be encountered by the condenser, the desired hardness of the material and the desired power factor vs. temperature characteristics. Ordinarily, hydrogenated wood resin, plasticized with from 5% to 25% of the added dielectric plasticizer will result in a solid material at ordinary temperatures. With from 25% to 50% of the added dielectric plasticizer, a material will result which will have a certain amount of cold flow and where 50% to 80% is added a viscid flowable material will result at room temperature.

A preferred hydrogenated wood resin base material may consist of 80% resin and 20% castor oil, combined by heating the resin to 130° C. and slowly adding the oil.

The dielectric compositions may generally be prepared by heating the hydrogenated wood resin to a temperature of from 100° C. to 150° C. and slowly adding the plasticizing dielectric.

In place of the mineral oil or castor oil other plasticizing dielectrics may be used, for instance, chlorinated di-phenyl which has a power factor temperature characteristic between that of castor oil and mineral oil. It possesses the ability to withstand excess temperatures because of its improved chemical stability.

The improvement resulting from the use of hydrogenated rosin dielectric compositions is evident from the drawing. Curve D shows the temperature-power factor characteristics of a wound foil type electrostatic condenser employing kraft paper separators impregnated with castor oil. Curve E shows the temperature-power factor characteristics of a condenser of similar structure employing a dielectric of mineral oil. Curve A shows temperature-power factor characteristics of a condenser of similar structure employing one of the dielectric compositions of this invention, comprising 80% hydrogenated rosin and 20% castor oil. Curve B gives the temperature power factor characteristics of a condenser of similar structure employing one of the dielectrics of this invention, comprising 80% hydrogenated rosin and 20% mineral oil. Curve C gives the temperature power factor characteristics of a condenser of similar structure employing a dielectric composition of this invention comprising 80% hydrogenated rosin and 20% hydrogenated castor oil.

It will be noted that a very important improvement has been effected, especially in the case of condensers employing a castor oil dielectric. Condensers of this type have a continuously rising power factor over the entire range whereas the combined hydrogenated resin-castor oil dielectric as shown in curve A shows a decreasing power factor temperature characteristic over the entire operating range. In the case of curves A, B and C it will be noted that within the operating ranges there is a reducing power factor rather than an increasing power factor.

Comparative condensers made from the same grade but unhydrogenated purified rosin showed an initial power factor when plasticized with 20% castor oil of 2.1% at 20° C. compared to .9% with hydrogenated rosin.

One of the major causes of breakdown of condensers used with capacitor motors, especially where the condenser is mounted within the motor frame, is the positive coefficient of power factor with temperature of the condenser dielectric. The dielectric breaks down due to progressive increase of power factor and temperature which tends to lower the dielectric strength. In direct contrast with this, the dielectrics of this invention have decreasing power factor with increasing temperatures, especially at temperatures experienced in small motors such as up to 60° C. The lowering of this power factor introduces a protective factor, allowing operation over a considerably longer period than has been possible with present and prior art dielectrics.

A factor of importance, common to the dielectric of this invention as well as the other thermoplastic dielectrics described in my copending applications Serial No. 258,819, filed Feb. 11, 1939, et al. is that the solid or plastic state of the dielectric tends to immobilize materials which otherwise by electrolytic or cataphoretic migration would produce localized effects with resultant short life, especially when operated continuously on alternating current voltages in the order of 330 volts and above. However, as pointed out in my previous applications, none of the highly polymerized hydrogenated resins when used alone are suitable as dielectrics. Due to their cracking on cooling and non-adherence to electrodes, they do not of themselves possess good voltage characteristics and the application of alternating currents produces shattering and vibration which tend to further impair their dielectric properties.

Hydrogenated rosin, because of its low cost is a preferred material. When combined with the plasticizing dielectric and heated to 130° C. it readily impregnates porous spacers, for example, kraft condenser paper such as is used in obtaining the power factor-temperature values indicated in the drawing. Where linen condenser paper is used a still lower power factor is obtained. When used with the combination of specially treated regenerated cellulose (described in my copending application S. N. 256,668, filed February 16, 1939) and paper, an initial power factor of about .45% is had and this steadily decreases with increase in temperature, to values comparable with those obtained with the kraft paper spacers.

The hydrogenated rosin tends to stabilize castor oil, preventing its breakdown at impregnating temperatures and allows the re-use of the castor oil compositions for much longer periods than is now possible with castor oil alone. This may be due to a formation of a hydrogenated ester.

Hydrogenated castor oil, like the saturated hydrocarbon resins such as the polymer of dihydronaphthalene, is very brittle and crystalline in character when solid. When it passes from the liquid to the solid state there is a considerable change in its volume which is probably the reason for the fractures observed throughout the solidified material. The volume change is probably also responsible for the fractures in the crystal boundaries. Such fractures greatly reduce the dielectric strength of the unplasticized resin.

These disadvantages are avoided and a very unusual and useful improved dielectric is produced by combining hydrogenated rosin with hydrogenated castor oil.

If these materials are melted and mixed together and allowed to cool rapidly they will have a lower power factor than the slowly cooled compositions. The improvement effected by rapid cooling is believed to result from the formation of a more homogeneous suspension mixture of the hydrogenated castor oil and hydrogenated rosin. As indicated by the dash line on the drawing, the dielectric constant of the hydrogenated castor oil composition abruptly changes at the crystallizing temperature, i. e. at about 68°. For instance, the capacity of a condenser will drop from 2.7 mfd. to 1.8 mfd. at the temperature at which the hydrogenated castor oil crystallizes but the capacity will rise again when the condenser is cooled.

The dielectric compositions of this invention, in common with the dielectric compositions described in my copending applications S. N. 255,819, filed Feb. 11, 1939, et al., allow for the first time, as far as I know, the provision of a condenser having in combination a dielectric spacer having a positive power factor temperature characteristic such as paper or regenerated cellulose and an impregnating dielectric having a decreasing power factor-temperature characteristic over the operating ranges which more than offsets the increasing power factor-temperature characteristics of the spacer. In the prior art all of the fluid or solid dielectrics possess an increasing power factor-temperature characteristic thus bringing about a cumulative increase in power factor with temperature.

This offsetting and retarding power factor characteristic of the dielectrics of this invention are effective even when the dielectric spacer is of a relatively non-porous material such as regenerated sheet cellulose. Tests show that the combination of regenerated sheet cellulose and castor oil-hydrogenated wood resin compositions of this invention have a decreasing power factor-temperature characteristic over the entire operating range whereas if any of the commonly used fluid dielectrics are substituted for the hydrogenated resin compositions of this invention there is a steadily rising power factor with temperature.

The condensers can be produced in any well-known manner, for example, by winding together interleaved metal foils and spacers of paper, plasticizer-free regenerated sheet cellulose and the like or combinations of these to form composite spacers of two or more layers. After winding the condensers they are impregnated by immersing them in the molten dielectric material of the present invention. Where a regenerated sheet cellulose spacer is used, it is preferred to pre-treat the cellulose film in the manner described in my co-pending application S. N. 256,668, filed Feb. 16, 1939, entitled "Sheet dielectric."

The various solid dielectric compositions of this invention are usually liquifiable at temperatures in the order of 90° C. to 130° C. at which point they readily impregnate wound foil type electrostatic condenser structures. However, in their preferred form they are sufficiently immobile and stable at all normal operating temperatures to prevent electrolytic or cataphoretic migration of conductive impurities between the foils. Unlike compositions of unhydrogenated wood resins, they are permanently thermoplastic and liquifiable and tenaciously adhere to the electrodes.

The composition of the invention may be used in the form of a dielectric impregnant for foil-paper wound condenser structures, the impregnation preferably being carried out at a temperature of about 130° C., at which point the mixtures are fluid and thin. The dielectric may also be produced by casting the material either alone or in combination with other dielectrics in suspension such as crystalline $TiO_2$, mica, etc. The dielectric may be employed in the manufacture of condensers by other methods known to the art, for instance, by directly coating foil electrodes with the dielectric composition without the use of an additional intervening spacer or by impregnating a porous spacer such as paper with the dielectric, thereafter winding the impregnated paper spacers with the electrode foils and subsequently heating the rolled unit to cause the ibpregnated paper to adhere to the foils and to provide a moisture proof seal around the unit. Also, the dielectric may be used in connection with other devices, such as cables, windings, coils, etc., where its characteristics make it a suitable impregnant or filler.

This application is a continuation in part of my copending applications S. N. 220,061, filed July 19, 1938, and S. N. 256,733, filed February 16, 1939.

What is claimed is:

1. A plasticized solid condenser dielectric material composed of solid hydrogenated tree resin in a substantial amount and the balance substantially a dielectric oil combinable therewith.

2. A composite condenser dielectric material composed of solid hydrogenated tree resin in a substantial amount and an organic dielectric composition adapted to combine therewith to form a solid plasticized dielectric.

3. A dielectric for electrostatic condensers and the like composed of solid hydrogenated tree resin in a major proportion.

4. A dielectric for electrostatic condensers and the like composed of solid hydrogenated tree resin and the balance substantially castor oil.

5. A dielectric for electrostatic condensers and the like consisting substantially of solid hydrogenated tree resin and a plasticizing dielectric combined therewith, said solid dielectric being liquifiable without decomposition at a temperature substantially not higher than 130° C. but being sufficiently stable and immobile at all normal operating temperatures to prevent electrolytic or cataphoretic migration of conductive impurities, said solid dielectric being water repellent.

6. A dielectric for electrostatic condensers and the like comprising solid hydrogenated tree resin and a dielectric combined therewith to produce a solid slightly plastic dielectric composition which is permanently thermoplastic and liquifiable.

7. A dielectric for electrostatic condensers and the like composed of solid hydrogenated rosin and a dielectric plasticizer combined therewith.

8. A condenser of the wound foil-spacer type having a dielectric impregnant comprising essentially polymerized hydrogenated tree resin, said resin being thermoplastic, thermoadhesive and liquifiable.

9. In an electric condenser of the wound foil-spacer type, a dielectric impregnant comprising essentially polymerized hydrogenated tree resin, said resin being thermoplastic, thermoadhesive and liquifiable.

10. In an electric condenser of the wound foil-spacer type, a dielectric impregnant consisting, to a substantial extent at least, of the product of hydrogenated tree resin and a liquid dielectric combinable therewith.

11. A dielectric impregnant consisting, to a substantial extent at least, of the product of hydrogenated tree resin and a liquid dielectric combinable therewith.

12. A dielectric material comprising hydrogenated tree resin and castor oil.

13. A dielectric for electrostatic condensers and the like composed of solid hydrogenated tree resin and the balance substantially mineral oil.

SAMUEL RUBEN.